(12) United States Patent
Delgado et al.

(10) Patent No.: US 7,329,826 B2
(45) Date of Patent: Feb. 12, 2008

(54) NOZZLE ASSEMBLY FOR WELDING TORCH

(75) Inventors: David Delgado, Rancho Cucamonga, CA (US); Michael Parker, Bradenton, FL (US)

(73) Assignee: Illinois Tool Works Inc., Glenview, IL (US)

( * ) Notice: Subject to any disclaimer, the term of this patent is extended or adjusted under 35 U.S.C. 154(b) by 519 days.

(21) Appl. No.: 10/870,172

(22) Filed: Jun. 17, 2004

(65) Prior Publication Data

US 2005/0279735 A1    Dec. 22, 2005

(51) Int. Cl.
*B23K 9/167* (2006.01)

(52) U.S. Cl. ..................... 219/75; 219/137.42
(58) Field of Classification Search ........... 219/137.31, 219/137.62, 75, 137.42
See application file for complete search history.

(56) References Cited

U.S. PATENT DOCUMENTS

| | | |
|---|---|---|
| 3,053,968 A | 9/1962 | Gorman et al. |
| 3,180,967 A | 4/1965 | Hill .............................. 219/75 |
| 3,450,857 A | 6/1969 | Webb ........................... 219/74 |
| 4,354,088 A | 10/1982 | Rehrig |
| 4,812,611 A | 3/1989 | Carleton ....................... 219/74 |
| 5,373,139 A | 12/1994 | Burgoon et al. ......... 219/137 R |
| 5,403,987 A | 4/1995 | Rehrig |
| 5,635,085 A | 6/1997 | Burgoon ....................... 219/74 |
| 5,714,729 A | 2/1998 | Yamada et al. ................ 219/75 |
| 5,772,102 A | 6/1998 | New et al. ..................... 228/42 |
| 6,037,557 A | 3/2000 | Sperling ....................... 219/75 |
| 6,525,288 B2 | 2/2003 | Rehrig ......................... 219/74 |

FOREIGN PATENT DOCUMENTS

| | | |
|---|---|---|
| EP | 1 201 346 A | 5/2002 |
| FR | 1 433 400 A | 6/1966 |

*Primary Examiner*—Kevin P. Kerns
(74) *Attorney, Agent, or Firm*—Fletcher Yoder

(57) ABSTRACT

A nozzle assembly operable to secure a porous disc within a welding torch. The nozzle assembly comprises a front nozzle member and a rear nozzle member. The front nozzle member is securable to the rear nozzle member. The porous disc is captured between the front nozzle member and the rear nozzle member when the front nozzle member is secured to the rear nozzle member.

32 Claims, 4 Drawing Sheets

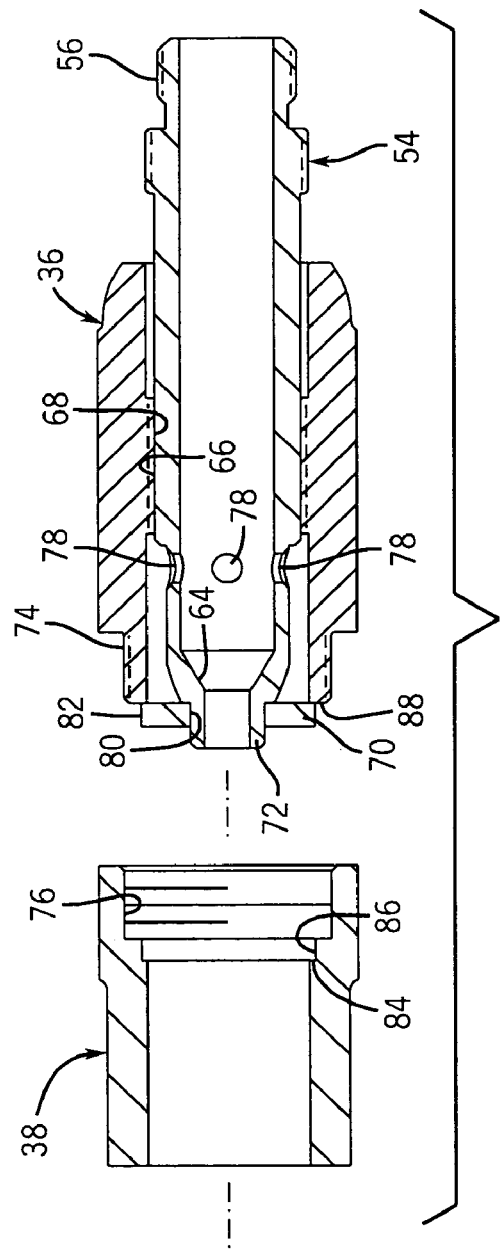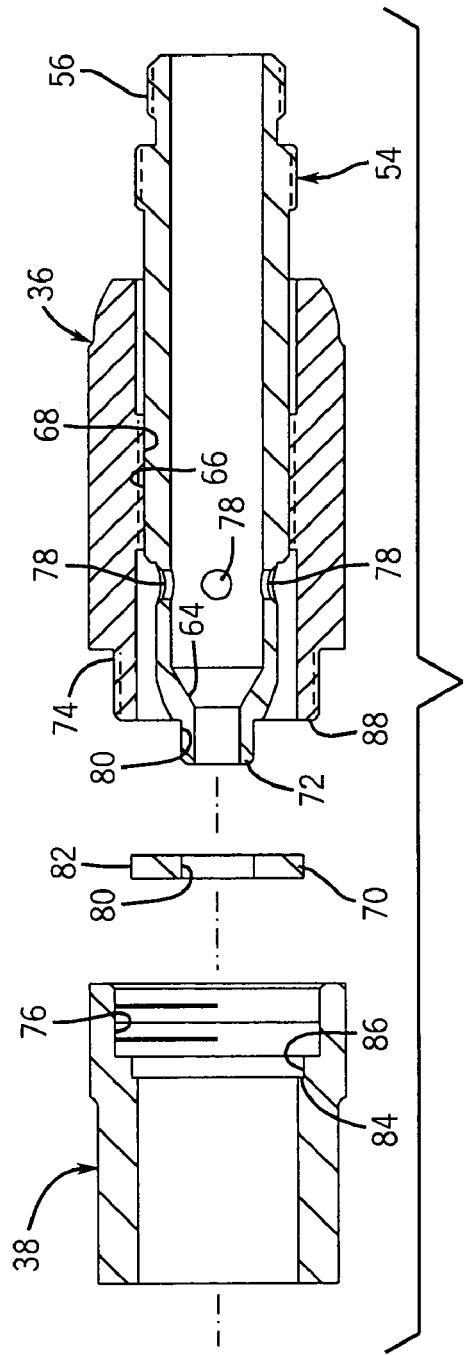
FIG. 4
FIG. 5

NOZZLE ASSEMBLY FOR WELDING TORCH

BACKGROUND OF THE INVENTION

The present invention relates generally to the field of arc welding, and more particularly to the field of tungsten inert gas (TIG) arc welding torches.

Arc welding is a welding process in which an electric current is used to produce localized melting in a work piece. There are many different types of arc welding processes. One example of an arc welding process is TIG welding (also known as gas tungsten arc welding, GTAW, or HELIARC). TIG welding is a type of arc welding process in which an electric arc is maintained between a welding implement, such as a hand-held welding torch, and a metal work piece. Typically, the welding implement includes a cylindrical electrode coupled to a torch head. The arc is produced by electricity that flows between the electrode and the work piece. Typically, the electrode is comprised of tungsten. The electricity for the arc welding process is provided by a power source coupled to the torch head of the welding implement by a power cable.

In TIG welding, a gas is directed toward the work piece to form a shield around the point of contact of the arc on the work piece. The gas shield prevents impurities from entering the weld puddle while it is in a molten state. A gas lens may be used to establish desired flow characteristics in the shield gas. For example, the gas lens may be used to produce a more uniform flow of gas across the width of the gas flow. Alternatively, the gas lens may be used to produce a slower flow of gas. Typically, a gas lens comprises at least one screen disposed in the flow path of the gas. However, a porous disc may be used, rather than a screen.

Typically, gas lenses that have used a porous disc have simply replaced the screen with the porous disc. The porous disc is wedged into a gas lens housing to secure the porous disc to the gas lens housing. By wedging the porous disc into the gas lens housing, friction is produced between the porous disc and the gas lens housing that secures the porous disc within the gas lens housing. However, wedging the porous disc inside the gas lens housing makes removal of the porous disc from the housing difficult. In some cases, a tool may be required to pry the porous disc loose from within the gas lens housing.

Therefore, a need exists for a technique to enable a porous disc to be secured within a welding torch without having to use friction to secure the porous disc within the housing. More specifically, a need exists for a technique to enable a porous disc to be secured within a welding torch such that the porous disc is fully accessible so that the porous disc does not have to be pried loose from a housing.

BRIEF DESCRIPTION OF THE DRAWINGS

The foregoing and other advantages and features of the invention will become apparent upon reading the following detailed description and upon reference to the drawings in which:

FIG. 4 is an exploded cross-sectional view illustrating the removal of a front nozzle member from a rear nozzle member of a welding torch, in accordance with an exemplary embodiment of the present invention; and FIG. 5 is an exploded cross-sectional view illustrating the removal of a porous disc from the rear nozzle member and a collet body, in accordance with an exemplary embodiment of the present invention.

SUMMARY OF THE INVENTION

A nozzle assembly operable to secure a porous disc within a welding torch. The nozzle assembly comprises a front nozzle member and a rear nozzle member. The front nozzle member is securable to the rear nozzle member. The porous disc is captured between the front nozzle member and the rear nozzle member when the front nozzle member is secured to the rear nozzle member. The rear nozzle member may be secured to a collet body secured to a torch head. The collet body may be disposed through the porous disc.

DETAILED DESCRIPTION OF SPECIFIC EMBODIMENTS

Figure 1:
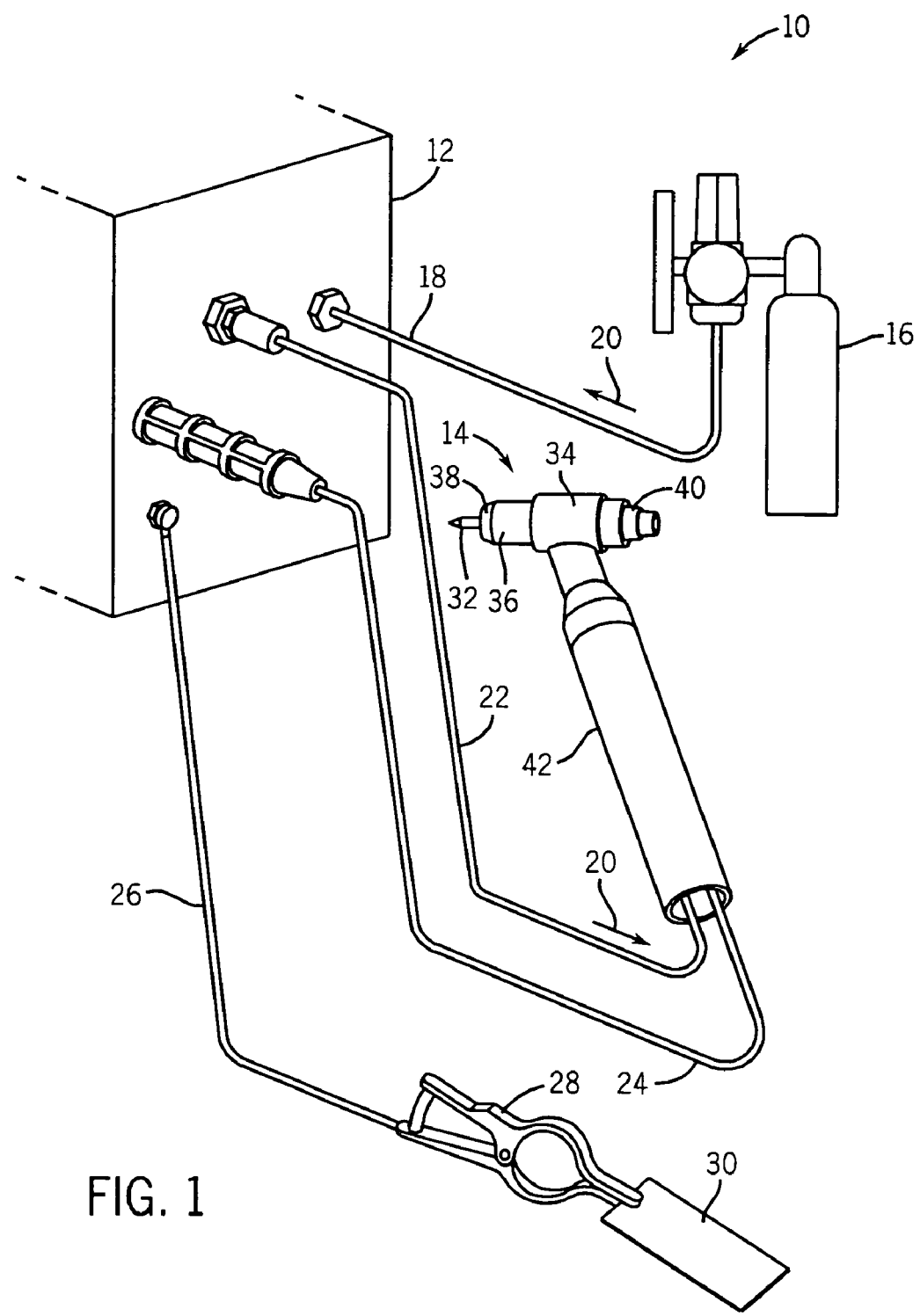
FIG. 1 is a perspective view of a welding system, in accordance with an exemplary embodiment of the present invention.

Referring generally to FIG. 1, a TIG welding system 10 is illustrated. The TIG welding system 10 comprises a welding power supply 12 and a welding torch 14. The power supply 12 may be a constant current AC power supply, a DC power supply, a combination AC/DC power supply, or some other type of power supply. In the illustrated embodiment, the system 10 also comprises a gas cylinder 16 that is coupled by a hose 18 to the welding power supply 12. The gas cylinder 16 supplies gas 20 to the welding power supply 12, which in turn supplies the gas 20 to the welding torch 14 via a second gas hose 22. A power cable 24 is also coupled from the welding power supply 12 to the welding torch 14. The system 10 also comprises a return cable 26 and clamp 28 to electrically couple a work piece 30 to the power supply 12.

The welding torch 14 is adapted to couple electricity from the power supply 12 to an electrode 32 secured within the welding torch 14 and to direct gas towards the work piece 30. When the electrode 32 comes into close proximity to the work piece 30, an arc is produced between the electrode 32 and the work piece 30. The arc completes a current path for electricity to flow from the power supply 12 to the work piece 30 through the welding torch 14. The current flows from the work piece 30 back to the power supply 12. The arc causes the work piece to be heated at the point of contact, which causes localized melting of the work piece 30.

The welding torch 14 has a torch head assembly 34 that is adapted to secure the electrode 32 to the torch assembly 34 and to couple electricity to the electrode 32. In addition, the torch head assembly 34 directs gas 20 towards the work piece 30. The torch head assembly 34 comprises a rear nozzle member 36 and a front nozzle member 38. A back cap 40 is provided to seal the end of the torch head assembly 34 opposite the rear nozzle member 36. In the illustrated embodiment, the front nozzle member 38 is threadably secured to the rear nozzle member 36. However, other methods of securing the front nozzle member 38 to the rear nozzle member 38 may be used. In addition, the rear nozzle member 36 and the front nozzle member 38 are tubular to enable gas 20 to flow through the first and second nozzle members 36, 38. As will be discussed in further detail below, the welding torch 14 has a porous disc that is provided to produce desired flow characteristics in the gas 20 flowing from the front nozzle member 38. For example, the flow of gas 20 may become turbulent because of abrupt changes in direction that the gas 20 experiences as it travels through the welding torch 14. Alternatively, it may be desired to slow the flow of gas flowing from the welding torch 14. The porous disc enables the welding torch 14 to slow the flow of gas and to produce a more laminar gas flow. Furthermore, in the illustrated embodiment, the first and second nozzle members 36, 38 are adapted to capture the porous disc therebetween, such that the porous disc is easily replaced. Finally, a handle 42 is coupled to the torch head assembly 34 to enable a user to direct movement of the welding torch 14.

Figure 2:
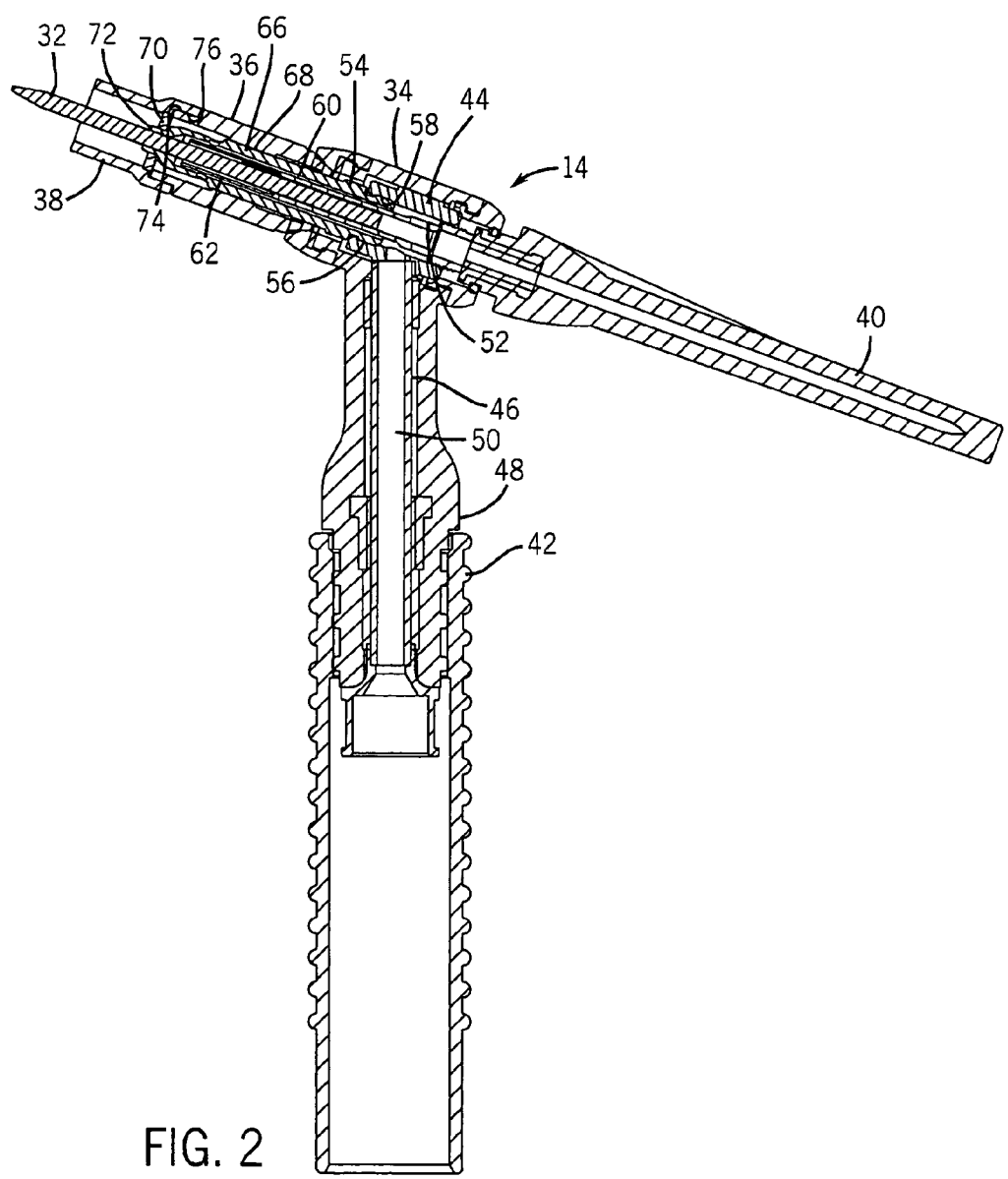
FIG. 2 is a cross-sectional view of a welding torch, in accordance with an exemplary embodiment of the present invention.

Referring generally to FIG. 2, a cross-sectional view of the welding torch 14 is illustrated. In this embodiment, the torch head assembly 34 comprises a torch head 44 and a tube 46. The torch head 44 and the tube 46 are electrically conductive. The tube 46 is provided to couple electricity to the torch head 44. Electrical insulation 48 is disposed over the torch head 44 and the tube 46 to protect a user from electric shock. The collet body 54 has a first threaded portion 56 and the torch head 44 has a corresponding threaded portion 58 to enable the collet body 54 to be secured to the torch head 44. The collet body 54 has a hollow interior 60. A collet 62 is disposed within the hollow interior 60 of the collet body 54 to secure the electrode 32 to the welding torch 14. The collet 62 is urged by the back cap 40 against a tapered surface 64 of the collet body 54, which compresses the collet 62 against the electrode 32. Gas is directed from the hollow interior 52 of the torch head 44 to the hollow interior 60 of the collet body 54 between the collet 62 and the collet body 54. The collet body 54 has a second threaded portion 66 that enables a corresponding threaded portion 68 of the rear nozzle member 36 to be threaded onto the collet body 54.

Gas 20 is directed to flow through a porous disk 70. In the illustrated embodiment, the porous disk 70 comprises a sintered metal and is disposed over an extension portion 72 of the collet body 54. Gas flows from the hollow interior 60 of the collet body 54 into the rear nozzle member 36. The porous disk 70 changes the flow characteristics of the gas 20. In addition, the rear nozzle member 36 and the front nozzle member 38 cooperate to capture the porous disk 70 therebetween. The rear nozzle member 36 has a threaded portion 74 and the front nozzle portion 38 has a corresponding threaded portion 76 that enables the front nozzle member 38 to be threadably secured to the rear nozzle member 36.

Figure 3:
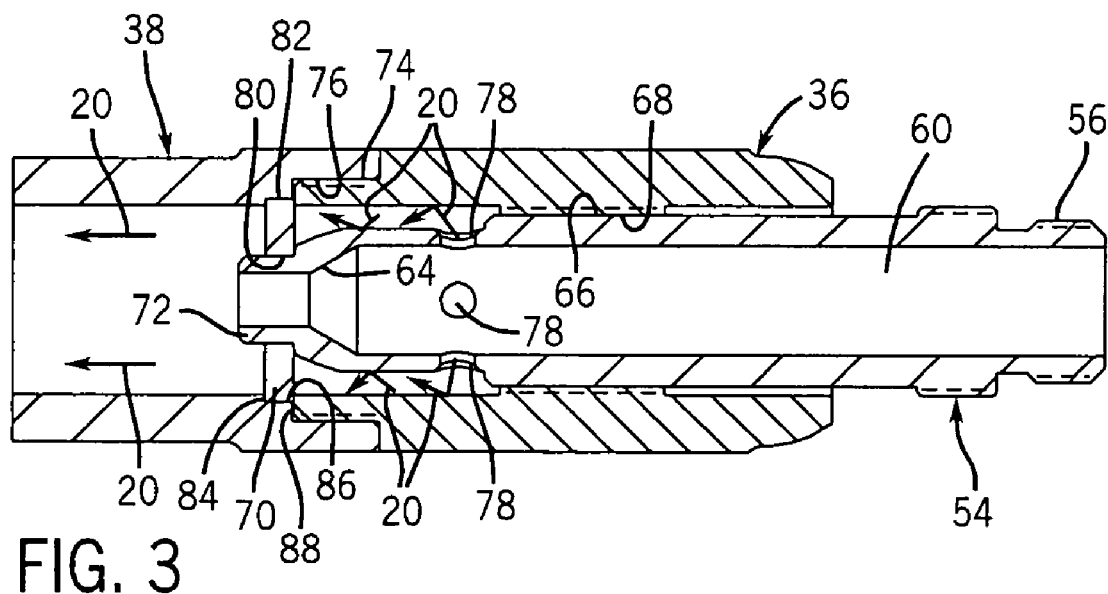
FIG. 3 is a detailed cross-sectional view of the welding torch of FIG. 2.

Referring generally to FIG. 3, gas 20 flows from the hollow interior 60 of the collet body 54 into the rear nozzle member 36 through holes 78 in the collet body 54. The porous disk 70 has a hole 80 to enable the extension 72 of the collet body 54 to be disposed through the porous disk 70. The porous disk 70 also has a circumferential surface 82. The front nozzle member 38 has a lip 84 and a groove 86, in which the porous disk 70 may be disposed. Alternatively, the porous disk 70 may be disposed on the extension 72 of the collet body 54. In either situation, the porous disk 70 is captured between the lip 84 of the front nozzle member 38 and an annular end surface 88 of the rear nozzle member 36 as the front nozzle member 38 is threaded onto the rear nozzle member 36, thereby capturing the porous disk 70.

Referring generally to FIGS. 4 and 5, the porous disk 70 may become clogged with debris over time. To replace the porous disk 70, the front nozzle member 38 is unthreaded from the rear nozzle member 36. In the illustrated embodiment, the outer circumferential surface 82 of the porous disk 70 is fully exposed and accessible when the front nozzle member 38 is removed from the rear nozzle member 36. This enables a user to easily grip the porous disk 70. Alternatively, the porous disc 70 may be removed with the second front nozzle member 38. The porous disc 70 may then be removed from the front nozzle member 38 by inverting the front nozzle member 38 to enable the porous disc 70 to fall from the front nozzle member 38. Because the porous disc 70 is not held within the welding torch 14 by friction, there is no need to pry the porous disc 70 from within either the rear nozzle member 36 or the front nozzle member 38.

Once the old porous disc 70 is removed, a new porous disk 70 may be installed within the welding torch 14. The porous disc 70 may be disposed over the extension 72 of the collet body 54 or placed within the annular groove 86 of the front nozzle member 38. When the front nozzle member 38 is threaded onto the rear nozzle member 36, the porous disc is captured between the lip 84 and the annular end surface 88 of the rear nozzle member 38. The lip 84 of the front nozzle member 38 may urge the porous disc 70 toward the annular end surface 88 of the rear nozzle member 36.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A nozzle assembly for a welding torch, comprising:
a first tubular nozzle member; and
a second tubular nozzle member securable to the first tubular nozzle member, wherein the first and second tubular nozzle members are adapted to capture a porous disc therebetween by contact with opposed sides of the disc adjacent to an outer circumferential surface thereof when the second tubular nozzle member is secured to the first tubular nozzle member.

2. The nozzle assembly as recited in claim 1, comprising a collet body disposed coaxially within the first tubular nozzle member and having a first threaded portion to enable the collet body to be threadably secured to the torch head.

3. The nozzle assembly as recited in claim 2, wherein the first tubular nozzle member comprises a first threaded portion to enable the first tubular nozzle member to be threaded to a second threaded portion of the collet body.

4. The nozzle assembly as recited in claim 3, wherein the first tubular nozzle member comprises a second threaded portion to enable the second tubular nozzle member to be threaded to the first tubular nozzle member.

5. The nozzle assembly as recited in claim 2, wherein the porous disc has a hole therethrough and the collet body comprises an extension operable to extend through the hole in the porous disc to support the porous disc.

6. The nozzle assembly as recited in claim 1, wherein the first nozzle member has a first inner diameter and the porous disc has an outer diameter greater in diameter than the first diameter.

7. The nozzle assembly as recited in claim 4, wherein the second nozzle member has an annular groove operable to receive the porous disc.

8. The nozzle assembly as recited in claim 5, comprising the porous disc.

9. The nozzle assembly as recited in claim 6, wherein the porous member comprises a sintered metal.

10. The nozzle assembly as recited in claim 1, wherein the first and second tubular nozzle members comprise a ceramic material.

11. The nozzle assembly as recited in claim 10, wherein the ceramic material comprises alumina.

12. A nozzle assembly for a welding torch, comprising:
a first nozzle member having an annular end surface; and
a second nozzle member securable to the first nozzle member and operable to receive a porous disc, wherein the second tubular nozzle member comprises an annular lip that captures the porous disc adjacent to an outer circumferential surface thereof between the annular lip of the second nozzle member and the annular end surface of the first nozzle member when the second nozzle member is secured to the first nozzle member.

13. The nozzle assembly as recited in claim 12, comprising the porous disc.

14. The nozzle assembly as recited in claim 13, wherein the porous member comprises a sintered metal.

15. The nozzle assembly as recited in claim 12, wherein the second nozzle member is threadably secured to the first nozzle member.

16. The nozzle assembly as recited in claim 12, comprising a torch head and a collet body securable to the torch head, wherein the first nozzle member has a first threaded portion to enable the first nozzle member to be threadably secured to the collet body.

17. The nozzle assembly as recited in claim 16, wherein the first tubular nozzle member comprises a second threaded portion to enable the second nozzle member to be threadably secured to the first nozzle member.

18. The nozzle assembly as recited in claim 12, wherein the second nozzle member has a lip operable to urge the porous disc toward the first nozzle member when the second nozzle member is secured to the first nozzle member.

19. The nozzle assembly as recited in claim 12, wherein the first and second nozzle members comprise a ceramic material.

20. The nozzle assembly as recited in claim 19, wherein the ceramic material comprises alumina.

21. A method of assembling a welding torch, comprising:
disposing a porous disc between a front tubular nozzle member and a rear tubular nozzle member; and
securing the front tubular nozzle member to the rear tubular nozzle member to capture the porous disc between the front tubular nozzle member and the rear tubular nozzle member by contact with opposed sides of the disc adjacent to an outer circumferential surface thereof.

22. The method as recited in claim 21, comprising disposing the porous disc within an annular groove within the front tubular nozzle member prior to securing the front tubular nozzle member to the rear tubular nozzle member.

23. The method as recited in claim 21, comprising disposing the porous disc over a collet body secured to the welding torch prior to securing the front tubular nozzle member to the rear tubular nozzle member.

24. The method as recited in claim 21, wherein securing the front tubular nozzle member to the rear tubular nozzle member comprises threading the front tubular nozzle member to the rear tubular nozzle member.

25. A kit for a welding torch, comprising:
a first threaded nozzle member; and
a second threaded nozzle member adapted to receive a disc therein, wherein the first and second threaded nozzle members are adapted to capture the disc therebetween by contact with opposed sides of the disc adjacent to an outer circumferential surface thereof when the second tubular nozzle member is threaded to the first tubular nozzle member.

26. The kit as recited in claim 25, comprising the disc, wherein the disc comprises sintered metal.

27. The kit as recited in claim 26, wherein the first threaded nozzle member has an annular end surface and the second threaded nozzle member has an annular lip, the disc being captured between the annular lip and the annular end surface when the second threaded nozzle member is secured to the first threaded nozzle member.

28. The kit as recited in claim 26, wherein the disc has a hole extending through the center of the disc.

29. The kit as recited in claim 26, comprising a collet body securable to a torch head, wherein the collet body has a tubular extension that supports the disc when the second threaded nozzle member is unthreaded from the first threaded nozzle member.

30. The kit as recited in claim 29, wherein the first threaded nozzle member is threadably securable to the collet body.

31. The kit as recited in claim 25, wherein the first and second threaded nozzle members comprise a ceramic material.

32. The kit as recited in claim 31, wherein the ceramic material comprises alumina.

* * * * *